(12) United States Patent
Lin et al.

(10) Patent No.: US 7,385,596 B2
(45) Date of Patent: Jun. 10, 2008

(54) STYLUS ATTACHMENT STRUCTURE FOR IT PRODUCTS

(75) Inventors: Shui-Yuan Lin, Taipei (TW); Yi-Chuan Lo, Taipei (TW); Chih-Kuang Chiang, Taipei (TW)

(73) Assignee: First International Computer Inc., Taipei (TW)

( * ) Notice: Subject to any disclaimer, the term of this patent is extended or adjusted under 35 U.S.C. 154(b) by 549 days.

(21) Appl. No.: 11/014,179

(22) Filed: Dec. 17, 2004

(65) Prior Publication Data

US 2006/0133015 A1 Jun. 22, 2006

(51) Int. Cl.
*G06F 3/033* (2006.01)

(52) U.S. Cl. .................... 345/179; 178/18.01

(58) Field of Classification Search ........ 345/156–169, 345/172–184; 178/18.01, 19.01, 19.02, 19.03, 178/19.04, 19.05; 361/686
See application file for complete search history.

(56) References Cited

U.S. PATENT DOCUMENTS

| | | | | |
|---|---|---|---|---|
| 5,067,573 A | * | 11/1991 | Uchida | .................. 345/173 |
| 5,483,262 A | * | 1/1996 | Izutani | .................. 345/179 |
| 5,845,161 A | * | 12/1998 | Schrock et al. | .............. 396/313 |
| 6,246,577 B1 | * | 6/2001 | Han et al. | ................... 361/686 |
| 6,924,791 B1 | * | 8/2005 | Nicolas et al. | .............. 345/179 |
| 2004/0119703 A1 | * | 6/2004 | Yang et al. | ................. 345/179 |

* cited by examiner

*Primary Examiner*—Richard Hjerpe
*Assistant Examiner*—Mansour M. Said
(74) *Attorney, Agent, or Firm*—Troxell Law Office, PLLC

(57) ABSTRACT

In a stylus attachment structure for an IT product, the attachment structure formed on an IT product, such as, a laptop, a tablet PC and a PDA, comprises an attachment slot, a push-out member, a retaining member and an elastic part, wherein the push-out member is arranged in the attachment slot and the retaining member is slidably mounted at one end of the attachment slot for selectively retaining or releasing the stylus. In this way, when the stylus is not in use for a while, it can be obliquely plugged to one end of the attachment slot, it is easy for the user to pick up the stylus; alternatively, the stylus can be fully received in the attachment socket and further secured in place with a retaining member, thereby enabling the stylus to be attached properly so that it doesn't become loose.

19 Claims, 8 Drawing Sheets

STYLUS ATTACHMENT STRUCTURE FOR IT PRODUCTS

BACKGROUND OF THE INVENTION

1. Field of the Invention

The present invention refers to a stylus attachment structure for IT products, and more particularly to a case that a stylus is used with touch screens or electromagnetic digitizers in the application of IT products, such as a laptops, tablet PCs or personal digital assistants (PDAs).

2. Description of the Prior Art

In the prior art, IT products, such as a laptops, tablet PCs or personal digital assistants (PDAs) are used with a touch screen or electromagnetic digitizer as well as a specially attached stylus that is used for inputting information.

For the portability of the stylus, IT products of the prior art are equipped with an attachment structure for storing the stylus. As shown in FIG. 1, a prior art stylus attachment structure of an IT product is provided. The IT product 5 is arranged with an attachment slot 51 that is a long groove and corresponds to the stylus 6, so that the stylus 6 can be plugged into the attachment slot 51.

However, with the above-mentioned stylus attachment structure, the stylus 6 is not easily picked up when it is used, since the user needs to pry it out with the tip of their finger. Conversely, when the stylus 6 is plugged into the slot 51 it is not attached in a secure manner, and is thus easily lost.

As described above, it is desirable to improve the inconvenience and disadvantage of the prior art stylus holder. Accordingly, this invention is provided to improve the above disadvantages with a reasonable design.

SUMMARY OF THE INVENTION

It is a main objective of this invention to provide a stylus attachment structure for IT products, wherein the stylus can be obliquely plugged at one end of the attachment slot and easy for the user to pick up, when it is not in use; alternatively the stylus can be fully received into the attachment slot and further retained in place with a retaining member, thereby enabling the stylus to be attached firmly thereby ensuring it doesn't slip out and become lost. When the user wants to use the stylus, simply pushing the retaining member releases the stylus. The stylus is then ejected by a push-out member, allowing the stylus to be removed easily.

In order to achieve the above objective, this invention provides a stylus attachment structure for IT products, a stylus attachment structure formed on an IT product comprises:

an attachment slot formed on the IT product for receiving the stylus; one end of the attachment slot is formed as a socket and one end of the stylus is inserted into the socket in place; a push-out member formed in the attachment slot, which is adapted to elastically support against the stylus received in the attachment slot;

a retaining member slidably mounted at the other end of the attachment slot for selectively retain or release the stylus; and an elastic part, which elastically support against the retained member, so as to enable the retaining member to retain the other end of the stylus received in the attachment slot.

The features and technical contents of the present invention will become apparent from the detailed description of the present invention with reference to the accompanying drawings, the detailed description and drawings are intended to be illustrative and not restrictive.

BRIEF DESCRIPTION OF THE DRAWINGS

The objectives, technological contents, features and performances of this invention will be more easily understood upon reading the following detailed description of particular embodiments, in conjunction with the accompanying drawings, wherein.

DETAILED DESCRIPTION OF THE EMBODIMENTS

Figure 1:
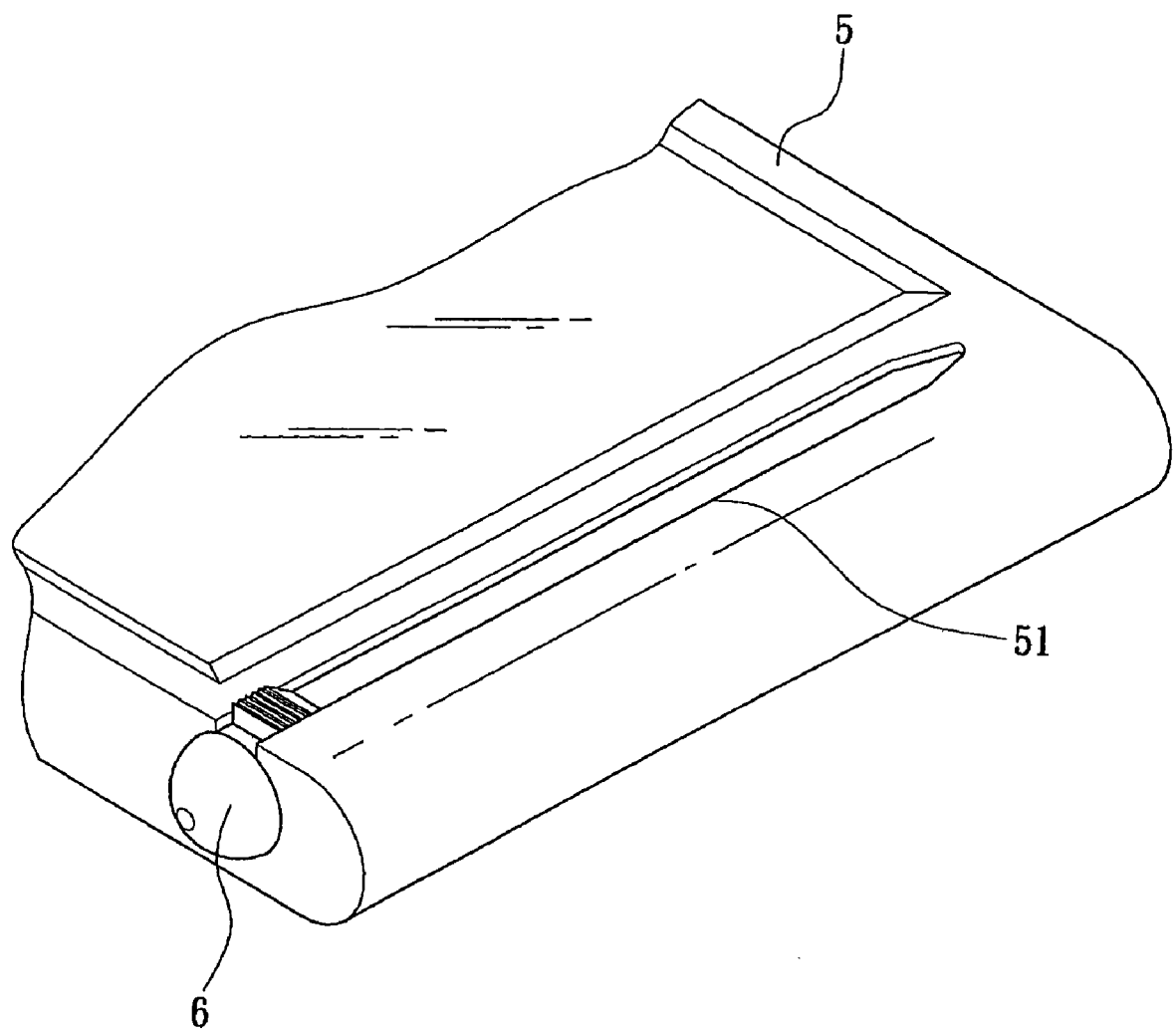
FIG. 1 is a spatial view of a prior art stylus attachment structure for an IT product.
Figure 2:
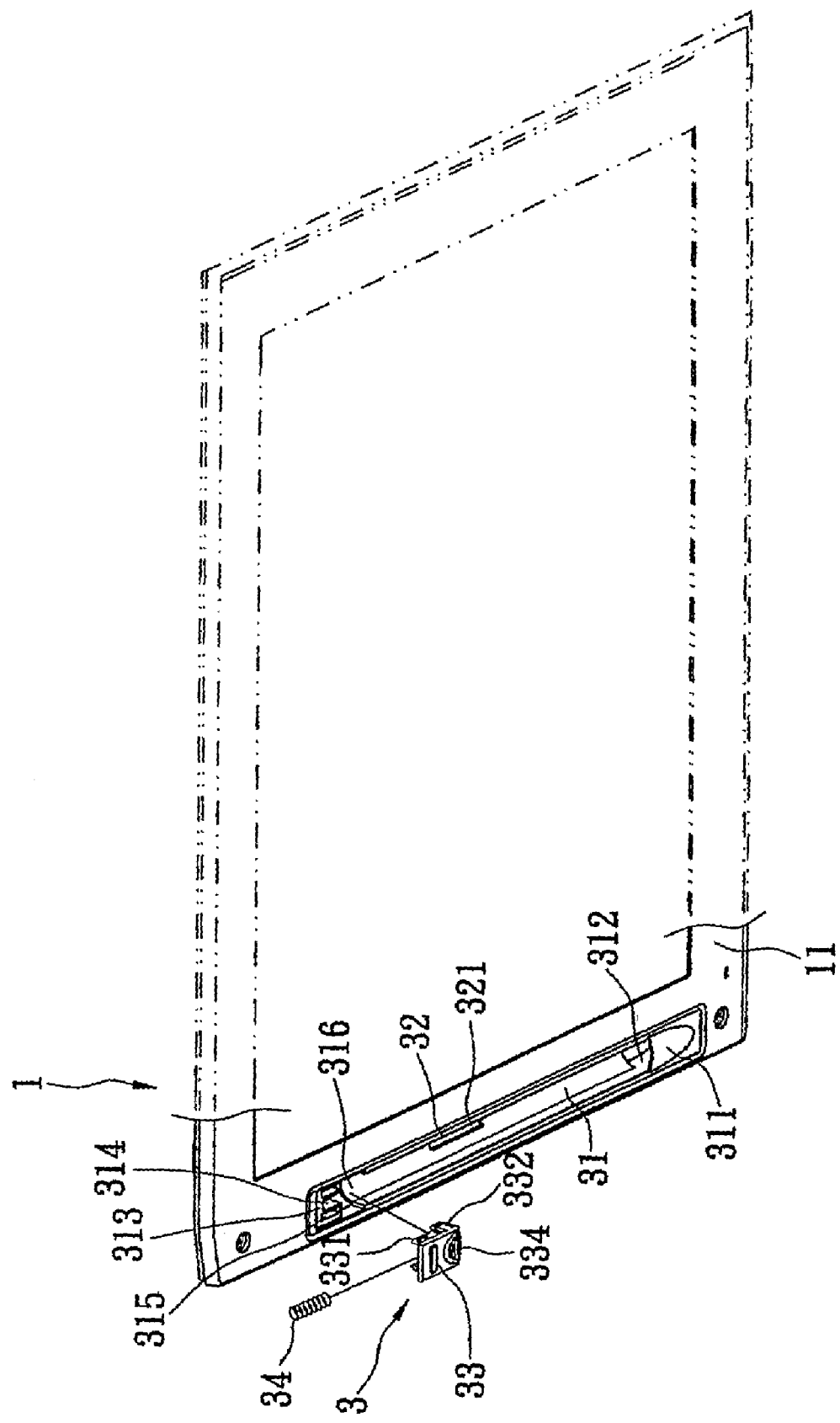
FIG. 2 is an exploded view of a stylus attachment structure for an IT product according to the present invention.
Figure 3:
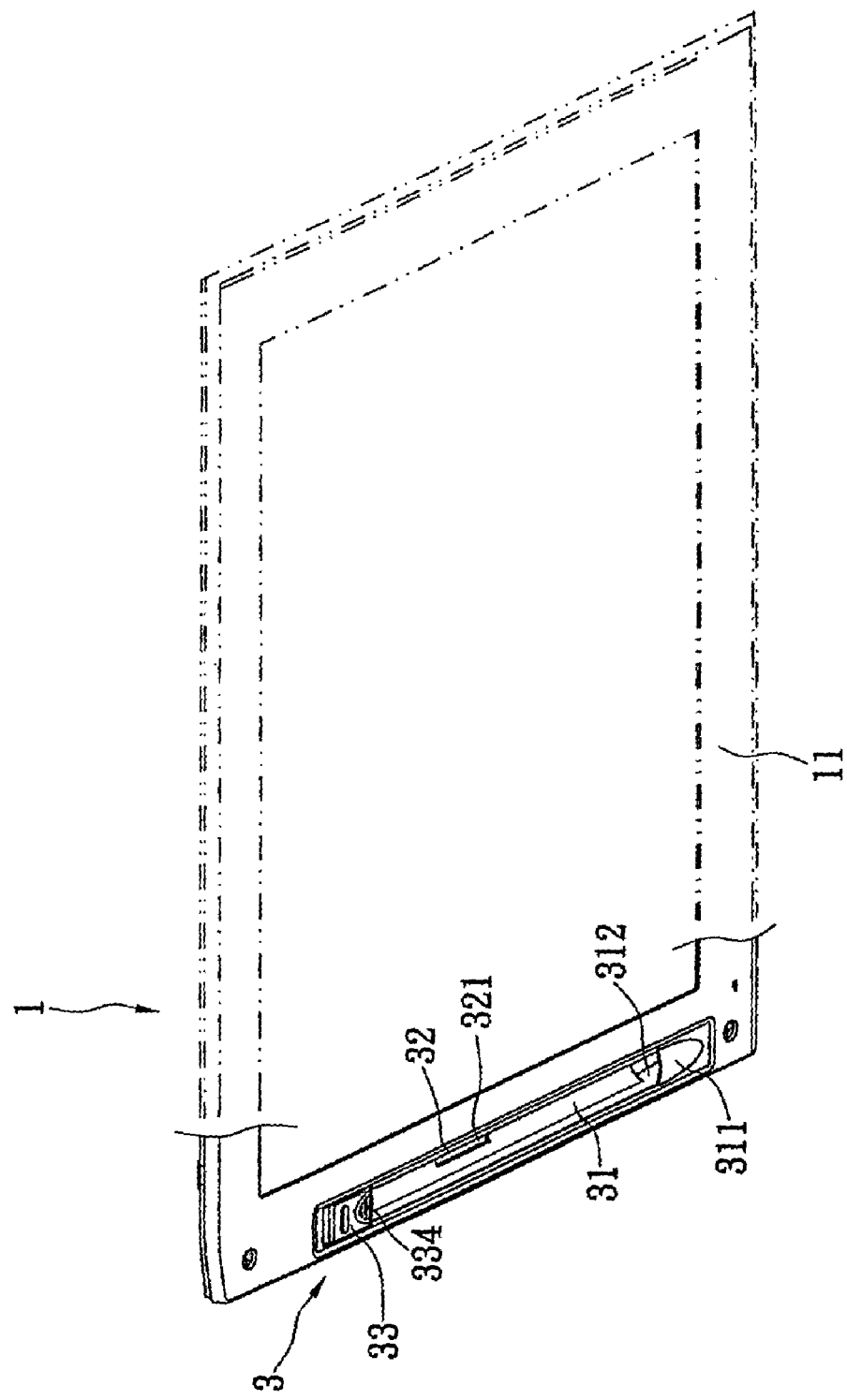
FIG. 3 is an assembly view of the stylus attachment structure for an IT product according to the present invention.
Figure 4:
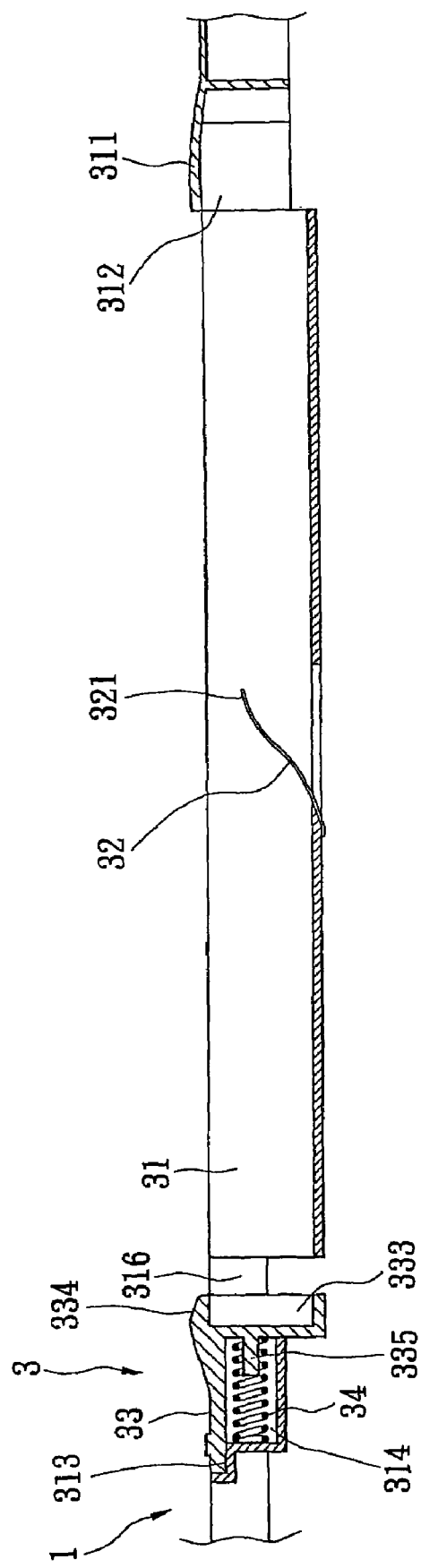
FIG. 4 is a cross section of the stylus attachment structure for an IT product according to the present invention as viewed longitudinally.
Figure 5:
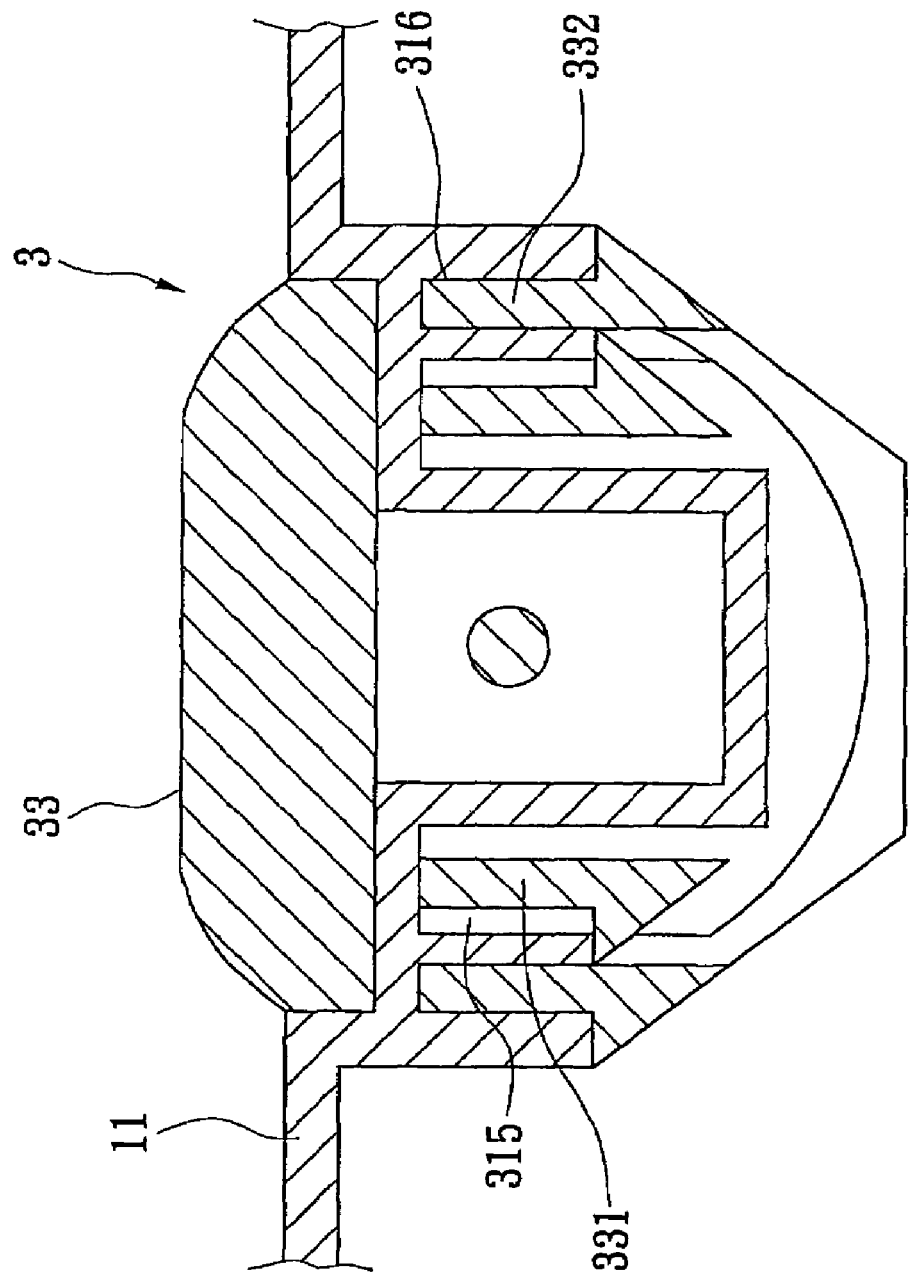
FIG. 5 is a cross section of the stylus attachment structure for an IT product according to the present invention as viewed laterally.
Figure 6:
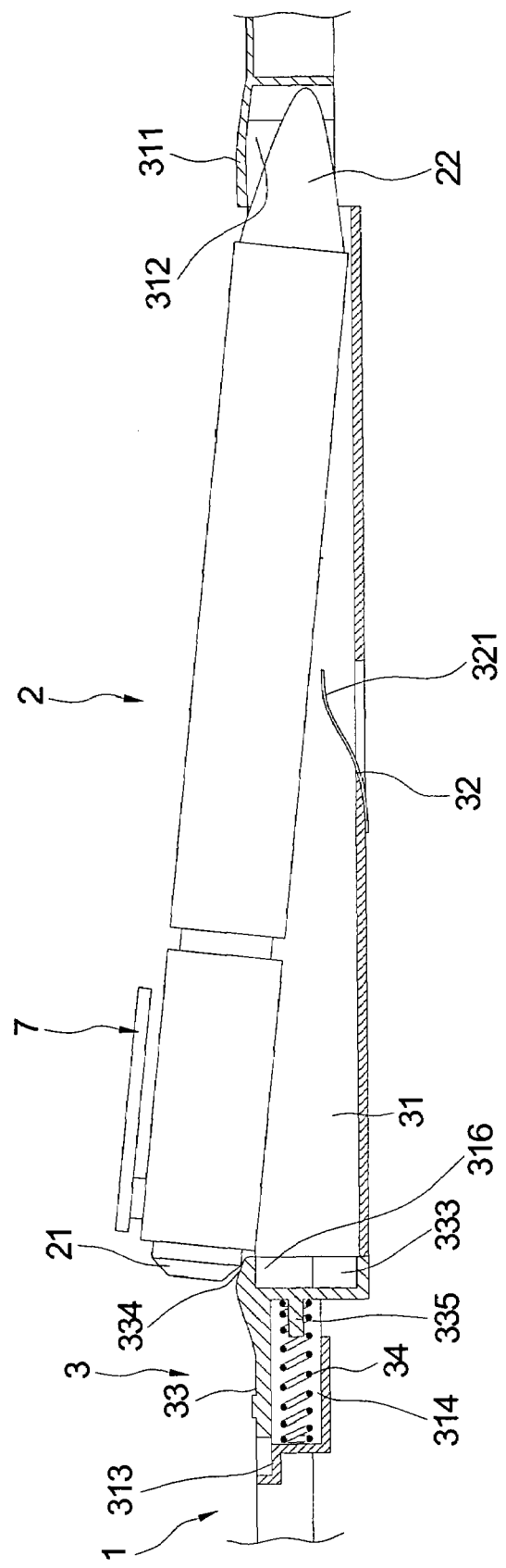
FIG. 6 is a view illustrating the stylus according to this invention being plugged obliquely.
Figure 7:
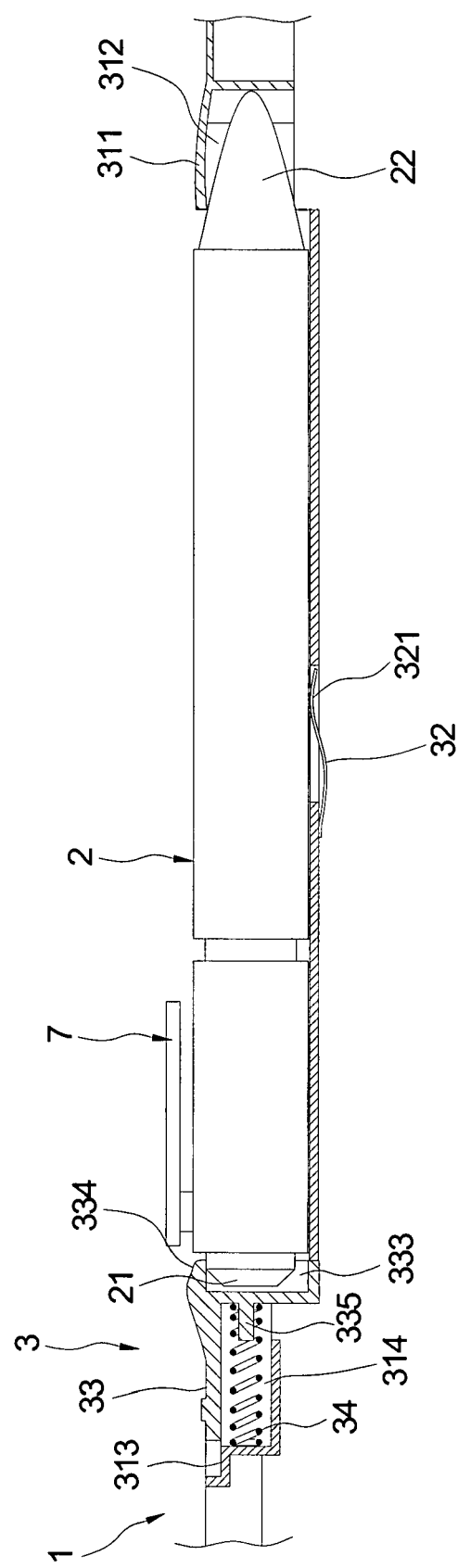
FIG. 7 is a view illustrating the stylus according to this invention being fully received.
Figure 8:
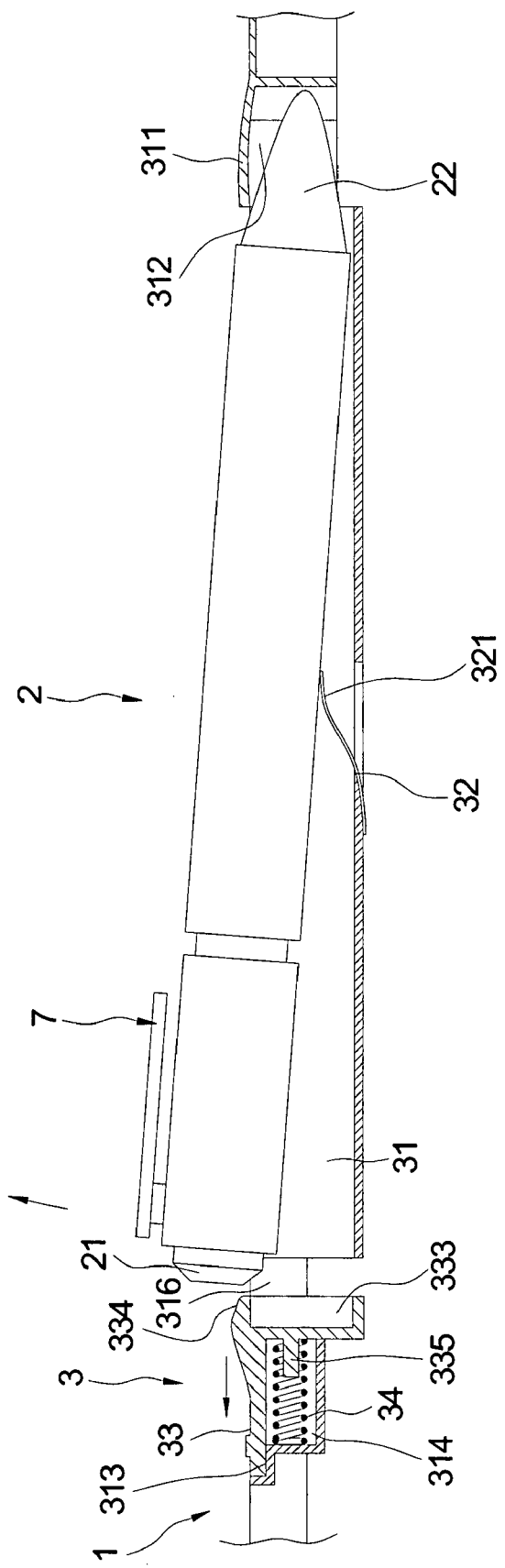
FIG. 8 is a view illustrating the stylus according to this invention being ejected.

Referring to FIGS. 2, 3, 4 and 5, the present invention provides a stylus attachment structure for an IT product. The stylus attachment structure 3 is provided in an IT product 1, such as a laptop, tablet PC or personal digital assistant (PDA) for receiving, retaining and ejecting a stylus 2 (as shown in FIGS. 6 to 8). A curved portion 21 is formed on the rear of the stylus 2 and a cone-shaped nib portion 22 on the front of the stylus 2. Optionally, the stylus 2 is formed with a clip, as shown in FIGS. 6-8. It is appreciated that the structure of the stylus 2 is not limited thereto, but varies depending on the actual requirements.

The attachment structure 3 comprises an attachment slot 31, a push-out member 32, a retaining member 33 and an elastic part 34, wherein the attachment slot 31 is formed on the case 11 of the IT product 1 and shaped as a long groove corresponding to the stylus 2 for storing the stylus 2. A cover 311 is arranged at one end of the attachment slot 31, and a socket 312 is formed on the inner side of the cover 311 so as to enable the nib portion 22 of the stylus 2 to be plugged and stored in the socket 312.

At the other end of the attachment slot 31, a sliding groove 313 is formed, and a recessed portion 314 is formed in the middle of the sliding groove 313 that is fitted to one end of the elastic part 34. Each respective longitudinal guiding hole 315 is formed at an appropriate interval from respective sides of the recessed portion 314. A through hole 316 is formed between the sliding groove 313 and the attachment slot 31. The guiding hole 315 and the through hole 316 are arranged through the inner of the case 11.

The push-out member 32 is an elastic member formed by a metal elastic strip, and is arranged in the attachment slot 31. One end of the push-out member 32 is fixed to the case 11 of the IT product 1 and the other end is extended inside the attachment slot 31 to form a support portion 321. The support portion 321 is arranged to elastically support against the stylus 2 received in the attachment slot 31, so as to enable the stylus 2 stored in the attachment slot 31 to be ejected.

The retaining member 33 is slidably engaged into the sliding groove 313 at one end of the attachment slot 31, and a pair of first and second guiding poles 331, 332 are formed to protrude from both sides of the bottom surface of the retaining member 33 respectively. The first and second guiding poles 331, 332 are shaped as a hook at their respective one end. The two first guiding poles 331 are slidably fitted into these guiding holes 315, and the pair of second guiding poles 332 are slidably fitted with both sides of the through holes 316. Respective one ends of the first and the second guiding poles 331, 332 are latched with the lower edges of the guiding holes 315 and the through hole 316, respectively, so that the retaining member 33 is prevented from disengaging from the sliding groove 313, and the retaining member 33 is guided to stably slide away from or close to the attachment slot 31 along the sliding groove 313. Therefore, it is possible to selectively retain or release the stylus 2.

A retaining hole 333 is formed at one end of the retaining member 33. A guiding plane 334 with a slope is formed at the upper edge of one end of the retaining member 33, and therefore when the rear end portion of the stylus 2 is brought into contact with the guiding plane 334, the retaining member 33 is pushed to slide away from the attachment slot 31. With the guide of the guiding plane 334, the rear end portion of the stylus 2 enters into the retaining hole 333. The retaining member 33 is formed with a projected portion 335, opposite to the recessed portion 314, so as to be fitted with the other end of the elastic part 34.

The elastic part 34 is a compression spring, one end of which is positioned in the recessed portion 314 at one end of the attachment slot 31, and the other of which is socketed to the projected portion 335 of the retaining member 33. In this way, the elastic part 34 is arranged between the endpoint of the recessed portion 314 and the retaining member 33 and one end of the elastic part 34 supports against the retaining member 33, such that the elastic force of the elastic part 34 pushes the retaining member 33 to slide along the sliding groove 313 towards the attachment slot 31, thereby latching and positioning the stylus 2 received in the attachment slot 31. According to the above-mentioned constitution, the stylus attachment structure of IT product according to this invention is implemented.

As shown in FIG. 6, when the stylus 2 won't be used for a while, the nib portion 22 of the stylus 2 can be plugged into the socket 312 at one end of the attachment slot 31 to lay the stylus 2 in an obliquely plugged manner, and only the rear end portion of the stylus 2 is positioned out of the attachment slot 31. In this way it is easy for the user to pick up the stylus.

As shown in FIG. 7, the stylus 2 can further be received fully in the attachment slot 31. In this case, the rear end portion of the stylus 2 can be pushed towards the attachment slot 31, so that the curved portion 21 of the rear end of the stylus 2 is brought into contact against the guiding plane 334 of the retaining member 33, so as to push the retaining member 33 to slide away from the attachment slot 31. The curved portion 21 of the rear end portion of the stylus 2 can then slide over the guiding plane 334 to be positioned in the retaining hole 333.

Meanwhile the retaining member 33 can slide close to the attachment slot 31 to reset due to the elastic force of the elastic part 34. In this way, the rear end of the stylus 2 is securely latched by the retaining member 33, and thus the stylus 2 is mounted in the attachment slot 31. At this time, the push-out member 32 is in a state that it is compressed by the stylus 2, this guarantees the stylus 2 will not become loose.

As shown in FIG. 8, when the user wants to use the stylus 2, simply pushing the retaining member 33, makes the retaining member 33 slide away from the attachment slot 31 to enable the rear end of the stylus 2 to disengage from the retaining hole 333, so the stylus 2 can be released from the retaining member 33. Sequentially, the stylus 2 is pushed out by the support portion 321 of the push-out member 32 and turned into an obliquely plugged state, in which the rear end portion of the stylus 2 is positioned out of the attachment slot 31, allowing the user to easily pick up the stylus 2.

Therefore, when the stylus 2 according to this invention is not in use for a while, its nib portion 22 can be plugged into the socket 312 at one end of the attachment slot 31, and only the rear end portion of the stylus 2 is positioned out of the attachment slot 31, so it is easy for the user to pick up the stylus; alternatively, the stylus 2 can be fully received in the attachment socket 312 and further secured in place with a retaining member 33, thereby enabling the stylus 2 to be attached properly so it doesn't become loose. A simple push of the retaining member 33 releases the stylus 2, and the stylus 2 is then ejected by a push-out member 32, so that it is easy to pick up the stylus 2.

In conclusion, this invention fully meets the requirements for a patent application. Therefore, the application is proposed according to patent law, it is desired that the invention will be obtained early, so as to protect the rights of the inventor.

With reference to the drawings, the above description has been given merely for one of the preferred embodiments of this invention, those skilled in the art will appreciate numerous modifications and variations therefrom. It is intended that the appended claims cover all such modifications and variations as fall within the spirit and scope of this present invention.

What is claimed is:

1. A stylus attachment structure for an IT product, wherein the attachment structure formed on an IT product, comprising:
   an attachment slot formed on the IT product, for receiving a stylus, wherein a socket is formed at one end of the attachment slot, so as to enable a nib portion of the stylus to be plugged and retained in the socket;
   a push-out member formed in the attachment slot, which is adapted to elastically support against a body portion of the stylus located between two ends of the stylus;
   a retaining member slidably mounted at the other end of the attachment slot for selectively retaining or releasing the stylus; and
   an elastic part, which elastically supports against the retaining member, so as to enable the retaining member to retain the other end of the stylus received in the attachment slot.

2. The stylus attachment structure for an IT product according to claim 1, wherein a sliding slot is formed at the other end of the attachment slot, into which the retaining member is slidably engaged to the sliding groove.

3. The stylus attachment structure for an IT product according to claim 1, wherein two longitudinal guiding holes and a through hole are formed at the other end of the attachment slot; and wherein a pair of first and second guiding poles are projectedly formed respectively at both sides of the bottom surface of the retaining portion, one ends of the first and second guiding poles are hook-shaped, the two first guiding poles are slidably fitted into the two guiding holes and the two second guiding poles are slidably fitted with both sides of the through hole, and respective one ends of the first and second guiding poles are latched with the lower edges of the guiding holes and the through hole.

4. The stylus attachment structure for an IT product according to claim 1, wherein a recessed portion is formed as the other end of the attachment slot, oppositely a projected portion is formed on the retaining portion, such that one end of the elastic part is received in the recessed portion and the other end of the elastic part is socketed to the projected portion.

5. The stylus attachment structure for an IT product according to claim 1, wherein one end of the push-out member is extended inside the attachment slot to form a support portion for elastically supporting against the stylus received in the attachment slot.

6. The stylus attachment structure for an IT product according to claim 1, wherein a retaining hole is formed at one end of the retaining member and a guiding plane with a slope is formed at the upper edge of the same end of the retaining member; oppositely a curved portion is formed at the rear end portion of the stylus, so as to enable the curved portion to slide over the guiding plane to be positioned in the retaining hole.

7. The stylus attachment structure for an IT product according to claim 1, wherein the stylus is provided with a clip.

8. The stylus attachment structure for an IT product according to claim 1, wherein a recessed portion is formed as the other end of the attachment slot, oppositely a projected portion is formed on the retaining portion, such that one end of the elastic part is received in the recessed portion and the other end of the elastic part is socketed to the projected portion.

9. The stylus attachment structure for an IT product according to claim 1, wherein one end of the push-out member is extended inside the attachment slot to form a support portion for elastically supporting against the stylus received in the attachment slot.

10. The stylus attachment structure for an IT product according to claim 1, wherein the stylus is provided with a clip.

11. A stylus attachment structure for an IT product, wherein the attachment structure formed on an IT product, comprising:

an attachment slot formed on the IT product, for receiving a stylus, wherein a socket is formed at one end of the attachment slot, so as to enable a nib portion of the stylus to be plugged and retained in the socket;

wherein two longitudinal guiding holes and a through hole are formed at the other end of the attachment slot, a pair of first and a second guiding poles are projectedly formed respectively at both sides of the bottom surface of the retaining portion, one ends of the first and second guiding poles are hook-shaped, the two first guiding poles are slidably fitted into the two guiding holes and the two second guiding poles are slidably fitted with both sides of the through hole, and respective one ends of the first and second guiding poles are latched with the lower edges of the guiding holes and the through hole;

a push-out member formed in the attachment slot, which is adapted to elastically support against the stylus received in the attachment slot;

a retaining member slidably mounted at the other end of the attachment slot for selectively retaining or releasing the stylus; and an elastic part, which elastically supports against the retaining member, so as to enable the retaining member to retain the other end of the stylus received in the attachment slot.

12. The stylus attachment structure for an IT product according to claim 11, wherein a sliding slot is formed at the other end of the attachment slot, into which the retaining member is slidably engaged to the sliding groove.

13. The stylus attachment structure for an IT product according to claim 11, wherein a recessed portion is formed as the other end of the attachment slot, oppositely a projected portion is formed on the retaining portion, such that one end of the elastic part is received in the recessed portion and the other end of the elastic part is socketed to the projected portion.

14. The stylus attachment structure for an IT product according to claim 11, wherein one end of the push-out member is extended inside the attachment slot to form a support portion for elastically supporting against the stylus received in the attachment slot.

15. The stylus attachment structure for an IT product according to claim 11, wherein a retaining hole is formed at one end of the retaining member and a guiding plane with a slope is formed at the upper edge of the same end of the retaining member; oppositely a curved portion is formed at the rear end portion of the stylus, so as to enable the curved portion to slide over the guiding plane to be positioned in the retaining hole.

16. The stylus attachment structure for an IT product according to claim 11, wherein the stylus is provided with a clip.

17. A stylus attachment structure for an IT product, wherein the attachment structure formed on an IT product, comprising:

an attachment slot formed on the IT product, for receiving a stylus, wherein a socket is formed at one end of the attachment slot, so as to enable a nib portion of the stylus to be plugged and retained in the socket;

a push-out member formed in the attachment slot, which is adapted to elastically support against the stylus received in the attachment slot;

a retaining member slidably mounted at the other end of the attachment slot for selectively retaining or releasing the stylus, wherein a retaining hole is formed at one end of the retaining member and a guiding plane with a slope is formed at the upper edge of the same end of the retaining member;

oppositely a curved portion is formed at the rear end portion of the stylus, so as to enable the curved portion to slide over the guiding plane to be positioned in the retaining hole; and an elastic part, which elastically supports against the retaining member, so as to enable the retaining member to retain the other end of the stylus received in the attachment slot.

18. The stylus attachment structure for an IT product according to claim 1, wherein a sliding slot is formed at the other end of the attachment slot, into which the retaining member is slidably engaged to the sliding groove.

19. The stylus attachment structure for an IT product according to claim 1, wherein two longitudinal guiding holes and a through hole are formed at the other end of the attachment slot; and wherein a pair of first and a second guiding poles are projectedly formed respectively at both sides of the bottom surface of the retaining portion, one ends of the first and second guiding poles are hook-shaped, the two first guiding poles are slidably fitted into the two guiding holes and the two second guiding poles are slidably fitted with both sides of the through hole, and respective one ends of the first and second guiding poles are latched with the lower edges of the guiding holes and the through hole.

* * * * *